United States Patent [19]

White

[11] Patent Number: 4,580,267
[45] Date of Patent: Apr. 1, 1986

[54] ANTI-STOKES RAMAN UPCONVERTER FOR $CO_2$ LASERS

[75] Inventor: Jonathan C. White, Lincroft, N.J.

[73] Assignee: AT&T Bell Laboratories, Murray Hill, N.J.

[21] Appl. No.: 474,566

[22] Filed: Mar. 11, 1983

[51] Int. Cl.[4] .............................................. H01S 3/00
[52] U.S. Cl. ...................................... 372/3; 372/57; 372/70; 372/71
[58] Field of Search .................... 372/3, 5, 70, 71, 55, 372/57; 307/425

[56] References Cited

U.S. PATENT DOCUMENTS 4,399,539 8/1983 White ...................................... 372/3

Primary Examiner—William L. Sikes
Assistant Examiner—Robert E. Wise
Attorney, Agent, or Firm—Wendy W. Koba

[57] ABSTRACT

Apparatus is disclosed for upconverting a laser spanning the near IR region into the near UV region. An alkali halide, for example, NaI, is photodissociated via a coherent or an incoherent pump source, for example, and ArF excimer laser or an ArF excimer flashlamp. A near IR laser, for example, a $CO_2$ laser, is then focused into a cell containing the photodissociated Na (Na*), thereby producing anti-Stokes Raman emission in the near UV region.

6 Claims, 3 Drawing Figures

ANTI-STOKES RAMAN UPCONVERTER FOR CO₂ LASERS

BACKGROUND OF THE INVENTION

1. Field of the Invention

The present invention relates to an upconverter arrangement for $CO_2$ lasers and, more particularly, to an upconverter arrangement which utilizes anti-Stokes Raman scattering in alkali atoms to upconvert $CO_2$ lasers to the near UV or visible spectral regions. In accordance with the present invention, efficient $CO_2$ lasers may be Raman shifted in one step to the 300 nm to 400 nm spectral region.

2. Description of the Prior Art

An anti-Stokes Raman laser may be defined as stimulated anti-Stokes Raman emission induced by a pump laser between two levels of the same parity in which a population inversion exists between the upper and lower Raman states. Such laser devices are particularly attractive since they are tunable by tuning the pump laser and, because the upper Raman state is often a metastable level, large inversion densities and high anti-Stokes output energies are possible. Early work in this area is reported in an article entitled "Observation of Stimulated Anti-Stokes Raman Scattering in Inverted Atomic Iodine" by R. L. Carman et al appearing in *Physical Review Letters* July 22, 1974 at pp. 190–193. As described therein, measurable gain in inverted I atoms may be obtained, where the $I^*(5p^5\ ^2P^o_{\frac{1}{2}})$ state is populated by flash photolysis of trifluoromethyliodide ($CF_3I$). The anti-Stokes Raman signal may be observed by pumping this inversion with the fundamental of a Nd:YAG laser at 1.06 μm and probing with a broadband dye. The article goes on to state, however, that superfluorescent emission at the nonresonant anti-Stokes wavelength was not observed during these experiments.

Observation of tunable, stimulated, vacuum-ultraviolet anti-Stokes Raman emission was later reported in the article "Tunable, 178-nm Iodine Anti-Stokes Raman Laser" by J. C. White et al appearing in *Optical Letters* Vol. 7, No 5, May 1982 at pp. 204–206. As reported, a metastable I* population inversion was created with respect to the ground site by selective photodissociation of NaI. With a 206 nm pump laser to drive the Raman process, anti-Stokes Raman laser radiation at 178 nm was generated with a pulse energy of 35 microjoules and was tunable over 10 cm⁻¹.

One arrangement which is capable of achieving Raman shifting is disclosed in U.S. Pat. No. 4,144,464 issued to T. R. Loree et al on Mar. 13, 1979, which relates to a device and method for nonresonant Stokes Raman shifting of ultraviolet radiation. As disclosed, Stokes Raman shifting of broadband UV excimer laser radiation is achieved by varying the pressure of the Raman scattering medium, the focal interaction length of the incident radiation within the Raman scattering medium, and its power density level. Gaseous molecular $H_2$, $D_2$, $CH_4$, HD and mixes thereof, and liquid $N_2$ are used as the Raman scattering medium to frequency shift the outputs of high power KrF and ArF lasers.

An alternative arrangement is disclosed in U.S. Pat. No. 4,151,486 issued to I. Itzkan et al on Apr. 24, 1979, which relates to a tunable alkali metallic vapor laser system. Stimulated Stokes Raman scattering in a low pressure atomic alkali metallic vapor of potassium or cesium is utilized wherein the atomic vapor is provided and them primed to populate an intermediate level such as the 4P level for potassium and the 6P level for cesium from which the desired upper laser level is accessible. After the population is created at the intermediate level, it is pumped to a virtual level near the desired upper laser level by a tunable dye laser and, via the stimulated Raman scattering process, generates the tunable output laser beam.

SUMMARY OF THE INVENTION

The present invention relates to an upconverter arrangement for $CO_2$ lasers and, more particularly, to an upconverter arrangement which utilizes anti-Stokes Raman scattering in alkali atoms to upconvert $CO_2$ lasers to the near UV or visible spectral regions.

It is an aspect of the present invention to employ an alkali halide compound which, upon being photodissociated, provides an excited alkali atom which may interact with a $CO_2$ laser to provide the upconverted output radiation.

Yet another aspect of the present invention is to employ either an exciter laser or excimer flash lamps to photodissociate the alkali halide compound.

Other and further aspects of the present invention will became apparent during the course of the following description and by reference to the accompanying drawings.

DETAILED DESCRIPTION

For the purposes of the present discussion, the alkali halide sodium iodide (NaI) will be employed as the parent lasing medium of the present invention. It is to be understood that any alkali halide compound may be employed and will differ from NaI only with respect to the various energy levels related thereto. Thus, any alkali halide compound may be employed in accordance with the present invention to provide a lasing medium from which the $CO_2$ laser may be upconverted. An energy level diagram depicting the action of the present invention for the alkali halide NaI and an ArF excimer laser is illustrated in FIG. 1.

Ground state NaI, when irradiated with an ArF excimer laser at 193 nm, will dissociate in accordance with the relation $$NaI + \lambda(193\ nm) \rightarrow Na^*(4s^2S_{\frac{1}{2}}) + I(5p^5\ ^2P^o_{3/2}). \qquad (1)$$

Figure 1:
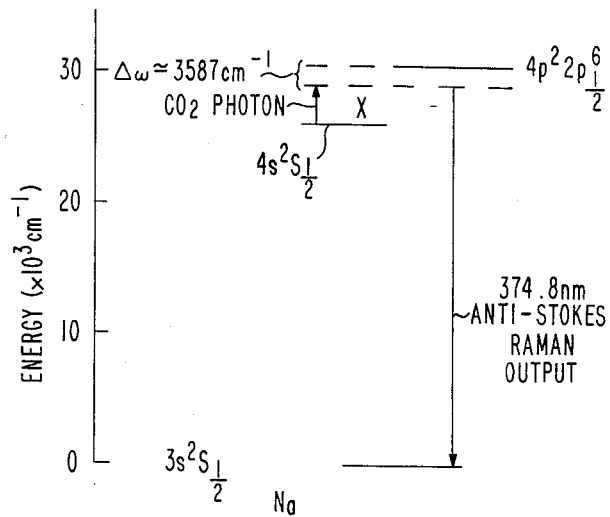
FIG. 1 illustrates the pertinent energy levels related to the operation of the present invention with NaI as the alkali halide and an ArF excimer laser as the photodissociator.

As seen by reference in FIG. 1, the application of the 193 nm radiation will move the ground state Na to the 4s $^2S_{\frac{1}{2}}$ energy level at 25740 cm⁻¹, which is a state of the same parity as that of the ground state of the Na atom. Before the population inversion at this metastable-like state can radiate to a lower energy state, a $CO_2$ photon is applied, as shown in FIG. 1, which functions to move the population to a higher energy level, near the 4p $^2P^o_{\frac{1}{2}}$ level at 30266 cm$^{-1}$. From this energy level, stimulated anti-Stokes Raman emission at 374.8 nm will occur, thus providing the upconversion of the $CO_2$ input.

Figure 2:
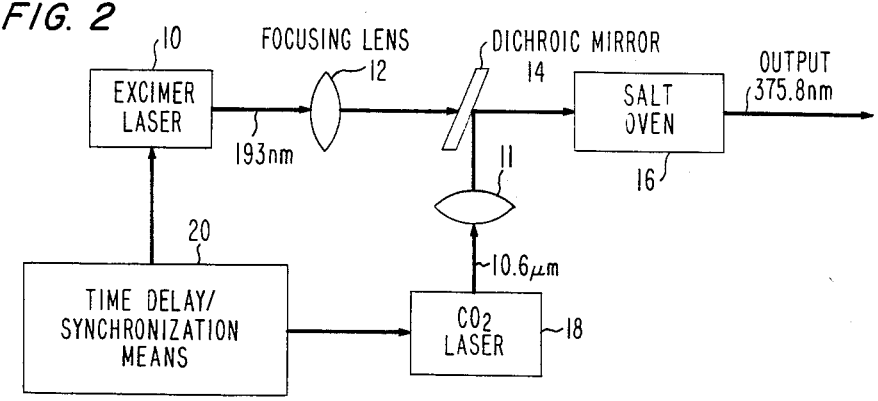
FIG. 2 illustrates a block diagram of one embodiment of the present invention which employs an excimer laser as the photodissociator.

An exemplary experimental apparatus capable of performing the above-described process in accordance with the present invention is illustrated in FIG. 2. In operation, an excimer laser source 10 produces a laser output, where for an ArF excimer laser, the output will be a 193 nm lightwave. The output passes through a focusing lens 12 and a dichroic mirror 14, and is subsequently applied as an input to a salt oven 16, where salt oven 16 contains the alkali halide compound, for example, NaI. Therein, the alkali halide compound is dissociated in accordance with equation (1) to create the metastable-like population inversion illustrated in FIG. 1. A $CO_2$ laser 18 is then activated, where it is focused using a focusing lens 11, reflected by dichroic mirror 14, and applied as an input to salt oven 16. As discussed hereinabove in association with FIG. 1, the $CO_2$ photon will move the population inversion to a level from which stimulated anti-Stokes Raman scattering will occur. Therefore, as seen by reference to FIG. 2, the output of salt oven 16 is a light wave at 375.8 nm. It is to be understood that the exact value of the output radiation is a function of both the alkali halide excimer laser utilized and the wavelength of the $CO_2$ laser used, where the value of 374.8 nm is associated with the use of the alkali halide NaI and an ArF excimer laser.

In order to control the application of the excimer laser pulse from ArF excimer laser source 10 and the $CO_2$ photon from $CO_2$ laser source 18, a time delay/synchronization means 20 is included in the arrangement illustrated in FIG. 2. Time delay/synchronization means 20, which may be a programmable precision delay generator, allows accurate control over the arrival of the laser pulses at salt oven 16 by controlling the initialization of both ArF excimer laser source 10 and $CO_2$ laser source 18. The intensity of the 374.8 nm anti-Stokes Raman laser output of salt oven 16 is a function of the time delay, as controlled by synchronization means 20, between the arrival of excimer laser 10 at 193 nm and the $CO_2$ pulse at 10.6 μm.

Figure 3:
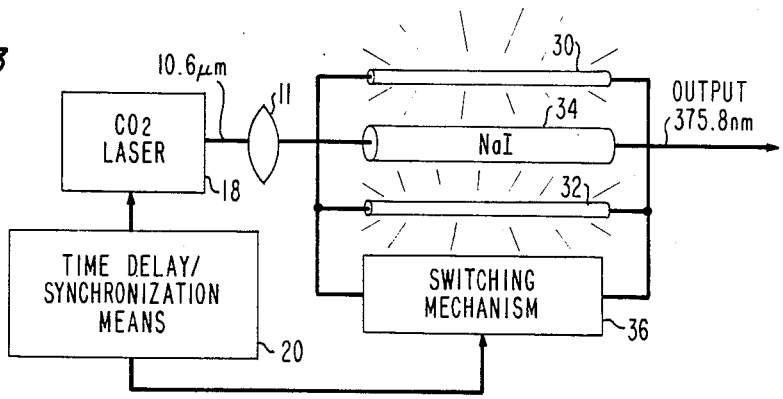
FIG. 3 illustrates a block diagram of an alternative embodiment of the present invention which employs a pair of excimer flash lamps as the photodissociator.

Since the photodissociation process employed in association with the present invention requires only an incoherent pump source, flash lamps may be employed in place of excimer laser 10, where an arrangement utilizing flash lamps is illustrated in FIG. 3. As shown, the excimer laser source 10 of FIG. 2 has been replaced by a pair of flash lamps 30 and 32, where ArF excimer flash lamps may be employed. The alkali halide compound is included in a quartz cell 34 which is disposed between the pair of flash lamps 30 and 32. A switching mechanism 36 is connected to both flash lamps 30 and 32 which functions to activate flash lamps 30 and 32. As with ArF excimer laser 10 of FIG. 2, the excitation of flash lamps 30 and 32 will cause the NaI in quartz cell 34 to be elevated to the higher energy level, as illustrated in FIG. 1. As with the arrangement discussed hereinabove in association with FIG. 2, a $CO_2$ laser pulse from a $CO_2$ laser source 18 is focused using focusing lens 11 and is used as an input to quartz cell 34 after the NaI has been sufficiently dissociated, where the initiation of both switching mechanism 36 and $CO_2$ laser source 18 is controlled by a time delay/synchronization means 20. Therefore, the output from quartz cell 34 will be the anti-Stokes Raman radiation at 374.8 nm, the same output that was achieved with the arrangement of FIG. 2.

What is claimed is:

1. Laser output conversion apparatus for displacing a laser output emission from a first frequency region into a second, higher, frequency region, said conversion apparatus comprising an alkali halide parent lasing medium including a ground state, an intermediate state, and at least one metastable-like state;

photodissociating means for creating a population inversion between said ground state and a metastable-like state of said alkali lasing medium; and a carbon dioxide ($CO_2$) laser source capable of generating laser output emission in the first frequency region, said carbon dioxide laser source being focused onto said alkali halide lasing medium for moving said population from said metastable-like state to the intermediate state of said alkali halide from which stimulated anti-Stokes Raman emission occurs at the second, higher, frequency region.

2. Laser output conversion apparatus formed in accordance with claim 1 wherein said apparatus further comprises time delay/synchronizing means for separately intitiating both the photodissociating means and the carbon dioxide laser source such that the output from said photodissociating means arrives at said alkali halide a predetermined time interval before the output of said carbon dioxide laser, thereby controlling the intensity of the anti-Stokes Raman lasing output of said alkali halide lasing medium.

3. Laser output conversion apparatus formed in accordance with claim 1 wherein the photodissociating means comprises an excimer laser source.

4. Laser output conversion apparatus formed in accordance with claim 3 wherein the excimer laser source comprises an ArF excimer laser.

5. Laser output conversion apparatus formed in accordance with claim 3 wherein the excimer laser source comprises a KrF excimer laser.

6. Laser output conversion apparatus formed in accordance with claim 1 wherein the photodissociating means comprises at least one excimer flash lamp.

* * * * *